(12) United States Patent
Boccaccio et al.

(10) Patent No.: US 8,964,861 B2
(45) Date of Patent: Feb. 24, 2015

(54) ACTIVE AND PROGRAMMABLE HDMI CABLE AND METHOD

(71) Applicants: Jeffrey A. Boccaccio, Palm Coast, FL (US); Jessy J. Crabb, Ormond Beach, FL (US)

(72) Inventors: Jeffrey A. Boccaccio, Palm Coast, FL (US); Jessy J. Crabb, Ormond Beach, FL (US)

(73) Assignee: Metra Electronics Corporation, Holly Hill, FL (US)

( * ) Notice: Subject to any disclaimer, the term of this patent is extended or adjusted under 35 U.S.C. 154(b) by 0 days.

(21) Appl. No.: 13/662,980

(22) Filed: Oct. 29, 2012

(65) Prior Publication Data

US 2014/0119423 A1 May 1, 2014

(51) Int. Cl.
*H04B 3/00* (2006.01)
*H04L 25/00* (2006.01)

(52) U.S. Cl.
USPC .......................................... 375/257; 375/259

(58) Field of Classification Search
CPC ................ H04L 1/205; H04L 25/0272; H04L 25/03885; H04L 25/08
USPC ......................................... 375/257, 259, 260
See application file for complete search history.

(56) References Cited

U.S. PATENT DOCUMENTS

| | | | | |
|---|---|---|---|---|
| 7,908,634 | B2 * | 3/2011 | Keady et al. .................. | 725/127 |
| 8,368,426 | B2 * | 2/2013 | Lee et al. ....................... | 326/82 |
| 2002/0186048 | A1 * | 12/2002 | Tang et al. ..................... | 326/86 |
| 2006/0256880 | A1 * | 11/2006 | Frisch ............................ | 375/257 |
| 2008/0195923 | A1 * | 8/2008 | Masumori ..................... | 714/821 |
| 2008/0250184 | A1 * | 10/2008 | Sheafor et al. ................ | 710/306 |
| 2009/0206962 | A1 * | 8/2009 | Chou et al. .................... | 333/28 R |
| 2010/0020179 | A1 * | 1/2010 | Horan et al. .................. | 348/181 |
| 2011/0148504 | A1 * | 6/2011 | Stakely et al. ................ | 327/427 |
| 2011/0150487 | A1 * | 6/2011 | Walter .......................... | 398/115 |

* cited by examiner

*Primary Examiner* — David B Lugo
(74) *Attorney, Agent, or Firm* — J. Wiley Horton

(57) ABSTRACT

A method for optimizing the performance of an active HDMI cable. An active cable compensator is provided within the HDMI cable itself. This device applies an individually-adjusted equalizer to each of the TMDS video data lines. A non-equalizing amplifier is applied to the two TMDS clock lines. An accelerator is applied to the I²C data bus. The parameters controlling each of the active components (such as parameters setting gain and frequency distribution) within an individual HDMI cable are set through a programming process. In that process, a calibration source sends known signals through the cable to a programming unit. A programming unit analyzes the signals through the cable and sends commands to the active cable compensator in the cable. The commands adjust the parameters in order to optimize the performance of the individual cable.

20 Claims, 10 Drawing Sheets

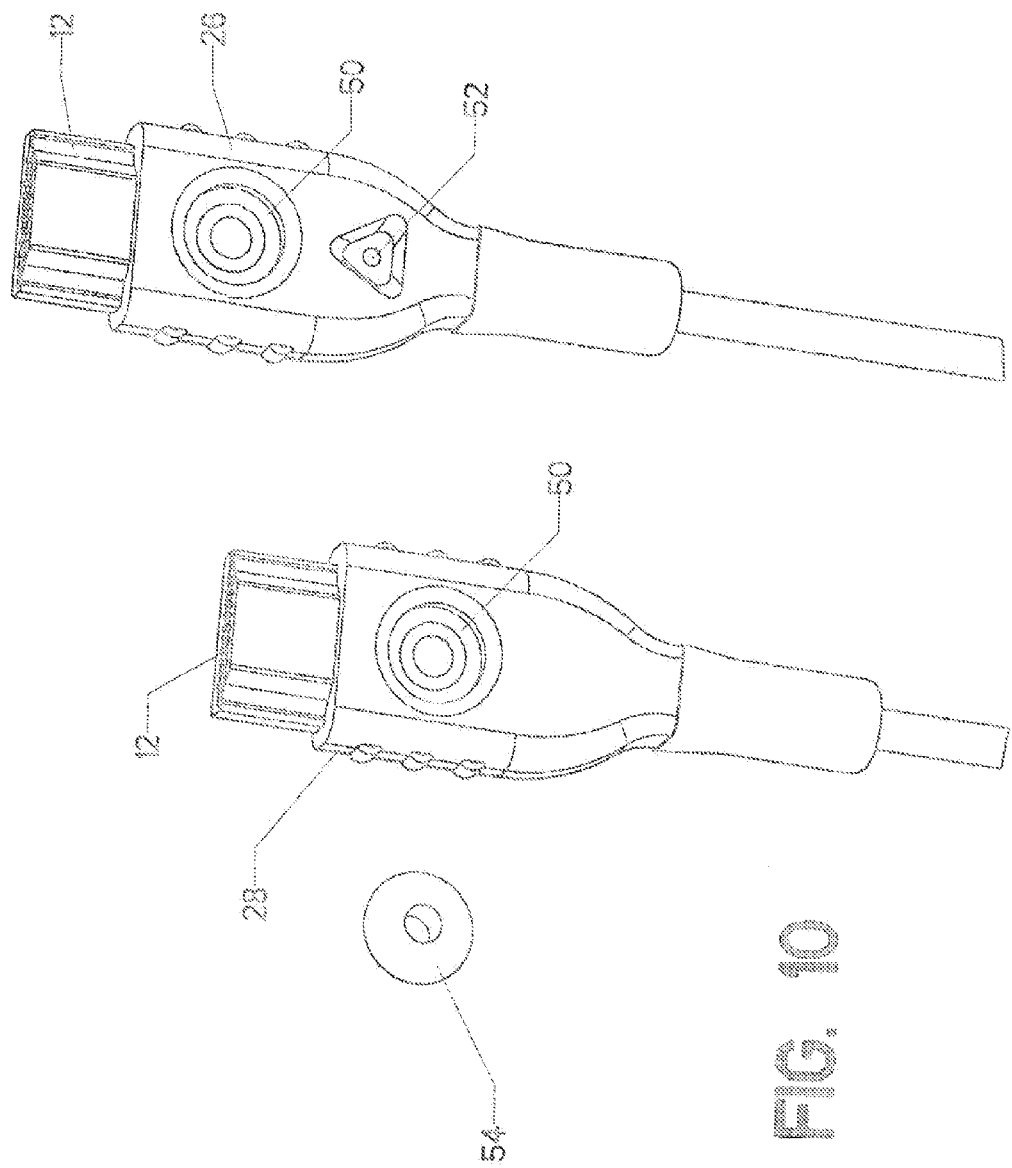

ACTIVE AND PROGRAMMABLE HDMI CABLE AND METHOD

CROSS-REFERENCES TO RELATED APPLICATIONS

Not Applicable.

STATEMENT REGARDING FEDERALLY SPONSORED RESEARCH OR DEVELOPMENT

Not Applicable.

MICORFICH APPENDIX

Not Applicable.

BACKGROUND OF THE INVENTION

1. Field of the Invention

This invention relates to the field of communications. More specifically, the invention comprises a method for programming an active HDMI cable in order to optimize its performance.

2. Description of the Related Art

The present invention is an enhancement of prior art HDMI cable technology. "HDMI" stands for "High-Definition Multimedia Interface." HDMI cable is commonly used to carry high-definition video and audio data between television-related components. For example, HDMI cables are often used to connect satellite "set top boxes" to associated video displays and surround-sound systems. However, HDMI cables carry more than just video and audio information. While there is some variability within the defined HDMI standards, most HDMI cables carry: (1) high-definition digital video data, (2) digital audio data, (3) CEC (consumer electronics connection) command data, (4) Ethernet data, (5) digital content encryption data, and (5) component "handshake" data.

The beauty of the HDMI standard is that all these connections are made via a single integrated cable. FIG. 1 shows a representative HDMI cable 10. An HDMI cable typically includes an integrated conductor bundle 16 having a termination 18 on each end. The conductor bundle includes multiple isolated conductors within a single protective jacket. Termination 18 provides a transition for the conductor bundle to connector 12.

Connector 12 opens into a cavity including numerous pins 14. The pins actually make the electrical connection when the connector is plugged into an HDMI receptacle. Connector 12 is referred to as a "male" connector in the traditional nomenclature of electrical connections. However, the reader will note that the connector actually includes a cavity that receives a protruding part on a corresponding HDMI receptacle. The pins 14 are biased inward. They maintain a clamping force when connector 12 is plugged into an HDMI receptacle, thereby making contact with the electrical "lands" provided on the receptacle.

FIG. 2 shows a complete HDMI cable 12 in a coiled state. Conductor bundle 16 includes a termination 18 on either end. The termination provides a transition between the parallel or twisted conductors in the conductor bundle and the connector 12. Bach conductor within the bundle is electrically connected to a pin within the connector. Termination 18 is commonly molded over the completed connections between the conductors and the pins within the connector (a process known as "overmolding"). The termination is relatively rigid, in order to provide strain relief for the connections between the conductors and the pins.

Conductor bundle 16 is preferably flexible, so that the cable may be bent and routed as desired. The flexibility of prior ait HDMI cables is limited by the diameter "D" and the materials selected. HDMI cables are known to have a fairly large diameter in comparison to the cable's length. For example. HDMI cables having a length of 1 to 3 meters typically have a diameter of 7 mm (0.275 inches). This relatively large diameter makes conductor bundle 16 relatively stiff, which can interfere with the routing of the cable around corners.

FIG. 3 shows an HDMI cable connecting source 20 to display device 22. A "source" can be any type of device that transmits data for use by an HDMI cable. Examples include satellite or cable set top boxes, DVD players, audio processing units, video recorders, etc. The term "display device" refers in this example to a video display that may or may not include audio capability as well. A good example is a high-definition television. The reader should bear in mind that a "display device" is only one type of device that might use an HDMI cable. One might more generally refer to the device in the position of display device 22 as a "sink." The term "sink" might include a surround-sound unit, a digital video recorder, or a computer. The reader should bear in mind throughout this disclosure that whenever the term "display device" is used one could substitute some other type of "sink" device.

Both source 20 and display device 22 are equipped with an HDMI receptacle 24. The connector on each end of the HDMI cable is plugged into an HDMI receptacle. Thus, the HDMI cable connects the source to the display device. Since the HDMI cable provides video data, audio data, and auxiliary conduits facilitating digital communication between the devices, it is often the only connection needed. This "one wire" approach is often touted as HDMI's main benefit.

However, existing HDMI cables have some drawbacks. First, the HDMI standard specifies a minimum mechanical extraction force of only 9.8N (2.2 pounds) for the HDMI connectors. This fact means that an HDMI connector is relatively easy to pull free of its socket. The available retention force would be sufficient if the HDMI connectors were attached to a thin and flexible cable. This is not typically the case, however. As mentioned previously, the conductor bundle portion of an HDMI cable is often relatively thick and rigid. When the cable is bent ami flexed between components the cable bundle itself creates extraction forces on the connectors. These forces may actually pull the connector free of the receptacle. Even if the connector is not pulled free, the forces placed on the connector may cause some of the individual pins within the connector to become disconnected.

The common thickness and rigidity of HDMI conductor bundles is driven by the existing HDMI technology, and it is important for the reader to understand the limitations of this technology before the present invention is discussed.

FIG. 4 shows the prior ait electrical connections that are actually made by an HDMI Type A cable. Source connector 26 receives inputs on 19 different pins (numbered 1 through 19 in the view). An electrical connection is made to corresponding pins (1-19) on sink connector 28. Pins 1-12 carry the high-definition video signals. The video signals are carried, in four "channels," commonly referred to as the red, green, blue, and clock channels. Transition-minimized differential signaling ("TMDS") is used for each of these channels. The "red" channel is designates as "TMDS D2" and is carried by three pins.

"Transition-minimized" ("TM") refers to a technique of bit encoding that clusters 1's and 0's together in order to minimize 1 to 0 or 0 to 1 transitions. A digital transition creates an edge of a square wave. This edge creates unwanted harmonic energy and can create electromagnetic interference. IM encoding minimizes these transitions.

"Differential signaling" ("DS") refers to a technique of sending two complementary signals on two paired wires. The polarity of the two (DC) signals is opposite. The two signals are typically fed into a subtracter on the receiving end. This device has the effect of doubling the amplitude of the desired signal while canceling any unwanted noise picked up by the transmitting lines. TMDS is the combination of "TM" and "DS" signaling.

The "TMDS D2" channel shown in FIG. 1 is carried by pins 1-3. Pin 1 is the positive half of the differential signal. Pin 3 is the negative half. Pin 2 is connected to a shield surrounding the positive and negative lines.

The "TMDS D1" channel carries the "green" signal. Pin 4 is the positive half of this differential signal while pin 6 carries the negative half. The "TMDS D0" channel carries the "blue" signal. Pin 7 carries the positive half of this signal while pin 9 carries the negative half. The "TMDS clock" channel carries the clock signal for the video feed on pins 10 and 12.

The reader will thereby appreciate that the HDMI standard uses three separate TMDS channels for the additive primary colors used in creating displayed video images. These signals are transmitted at a very high rate (3.4 GHz). Even a small change in the propagation characteristics of the copper conductors used to carry the components can cause problems. "Intra-pair skew" is defined as a difference in propagation speed between the positive and negative lines in a differential pair (such as the conductors connecting the two Pin 1's and the conductors connecting the two Pin 3's). A slight difference in arrival times for the two components of a pair can cause a data bit to fall outside of the decision boundary defined for that bit (referenced to the clock signal). Digital 1's can then become 0's and vice-versa. Small difference in conductor length, twists, and kinks in the cable can all cause these problems.

The remaining pins in the prior art HDMI cable connectors serve additional functions. Pin 13 carries a Consumer Electronics Connection ("CEC") data. CEC data allows one HDMI-compatible device to control another. For example, a user can employ a remote control for a television to also control a DVD player using commands sent over the CEC.

Pins 14 and 19 in conjunction serve as an Ethernet connection. Pin 14 is the positive portion of the pair and Pin 19 is the negative portion (as well as serving an additional function).

Pins 15 and 16 are used for a Display Data Channel ("DDC") that operates over an $I^2C$ bus. The $I^2C$ bus is in fact significant to the present invention as it is used as the carrier for signals that program the active components of the inventive HDMI cable.

Pin 17 provides a ground connection, while Pin 18 provides +5 V DC. Pin 19 serves as the negative pair for an Ethernet connection when such a connection is in use. In addition, Pin 19 provides a "hot plug detect" function. The source device monitors this pin. When a receiving device is initially plugged into the cable, the source device will detect a 5 V signal on Pin 19. This then initiates an exchange of data between the source and sink devices.

The cable connection schematically illustrated in FIG. 4 represents a purely passive device. The source and sink devices are active, but the connection between the two is simply a bundle of passive connectors. Various prior art schemes are used to facilitate accurate data transfer such as shielding, the use of differential signaling, etc. However, the use of a passive cable introduces certain well known problems.

The simplest problem is that of voltage drop. All the conductors shown in FIG. 4 have resistance. As the length of the cable increases, the voltage drop across the conductors increases. The result is the eventual failure of some of the signals. For example, the "hot plug detect" signal may fall so far below the nominal 5V that it is simply not detected. The prior art solution to this problem has been to use larger gage conductors. This approach works to a certain extent, bat h causes the cables diameters to be larger and it causes the cables to be stiffer.

A second recognized problem is that of tolerance growth. The characteristics of the prior art conductors all have associated tolerances. An example would be the conductor's resistance and impedance. The tolerances generally vary proportionally with length. As an example, if a 1 meter cable has an impedance tolerance of +/−0.1 ohms, then a 2 meter cable constructed the same way would typically have an impedance of +/−0.2 ohms. This is inherent in a passive conductor. Because the tolerances grow with increasing cable length, a point will be reached where the conductors are out of tolerance (especially critical with differential pairs). This issue limits the length of cable.

A third recognized problem is that of rise time, particularly on the $I^2C$ data bus. This bus is a simple serial interface that transmits data at a rate of 100 KHz. Rise time is driven in part by the capacitance and inductance of the receiving device. Data is bidirectional on this bus so the receiving device could be either the source or the sink. However, rise time problems resulting from the sink characteristics are most common. Increasing cable length tends to increase rise time, and this factor has also limited the effective length of prior art HDMI cables.

All these issues are inherent in the prior art HDMI cable design. The solution has been to (1) limit cable length, and (2) use large conductors. Limiting the cable length has obvious disadvantages. The use of large conductors has made the HDMI conductor bundles large in diameter and, as a result, fairly stiff. It would be advantageous to provide a solution that provides a longer cable length while retaining a relatively small diameter cable. The present invention provides such a solution.

BRIEF SUMMARY OF THE PRESENT INVENTION

The present invention, comprises a method for optimizing the performance of an active HDMI cable. An active cable compensator is provided within the HDMI cable itself. This device applies an individually-adjusted equalizer to each of the TMDS video data lines. A non-equalizing amplifier is applied to the two TMDS clock lines. An accelerator is applied to the $I^2C$ data bus. Power for the active components is obtained by (1) extracting a portion of the current available on the 5 VDC line, and (2) "scavenging" available power from the 3.3 V pull-up rail voltage on each of the differential TMDS lines. Sufficient power is thereby obtained to eliminate the need for an external power supply. The active HDMI cable is thus self-contained.

The parameters controlling each of the active components (such as parameters setting gain and frequency distribution) within an individual HDMI cable are set through a programming process. In that process, a calibration source sends known signals through the cable to a programming unit. A programming unit analyzes the signals through the cable and sends commands to the active cable compensator in the cable. The commands adjust the parameters in order to optimize the performance of the individual cable.

BRIEF DESCRIPTION OF THE SEVERAL VIEWS OF THE DRAWINGS

FIG. 10 is a perspective view, showing how an integrated circuit can be incorporated into the active HDMI cable.

REFERENCE NUMERALS IN THE DRAWINGS

| 10 | HDMI cable | 12 | connector |
|---|---|---|---|
| 14 | pin | 16 | conductor bundle |
| 18 | termination | 20 | source |
| 22 | display device | 24 | HDMI receptacle |
| 26 | source connector | 28 | sink connector |
| 30 | active cable compensator | 32 | current limiting resistor |
| 34 | diode | 36 | tap |
| 38 | return | 40 | accelerator |
| 42 | equalizer | 44 | open eye pattern |
| 45 | calibration source | 46 | programming unit |
| 48 | active HDMI cable | 50 | nub receiver |
| 52 | vent | 54 | color nub |

DETAILED DESCRIPTION OF THE INVENTION

Figure 1:
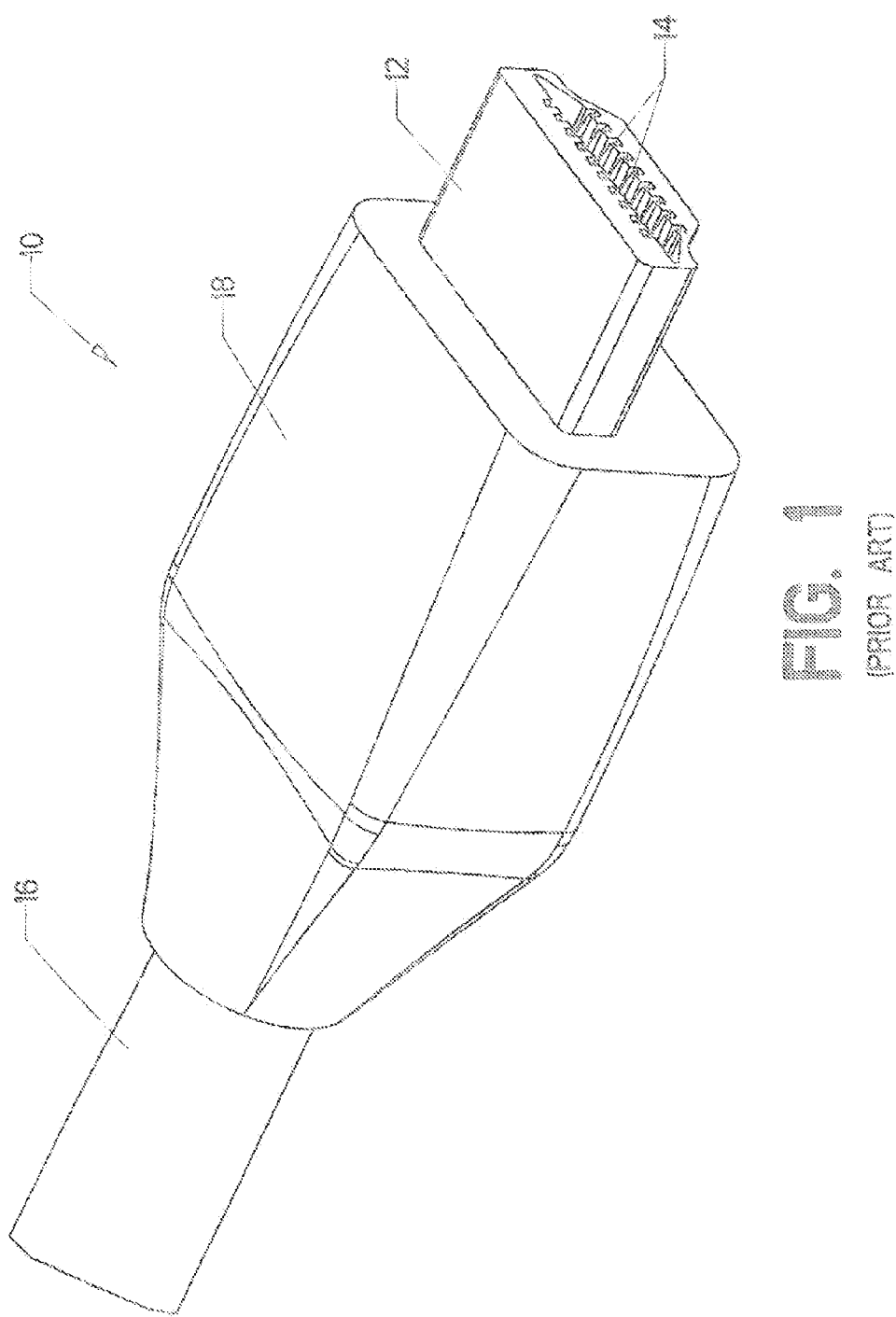
FIG. 1 is a perspective view, showing a portion of a prior art HDMI cable.
Figure 2:
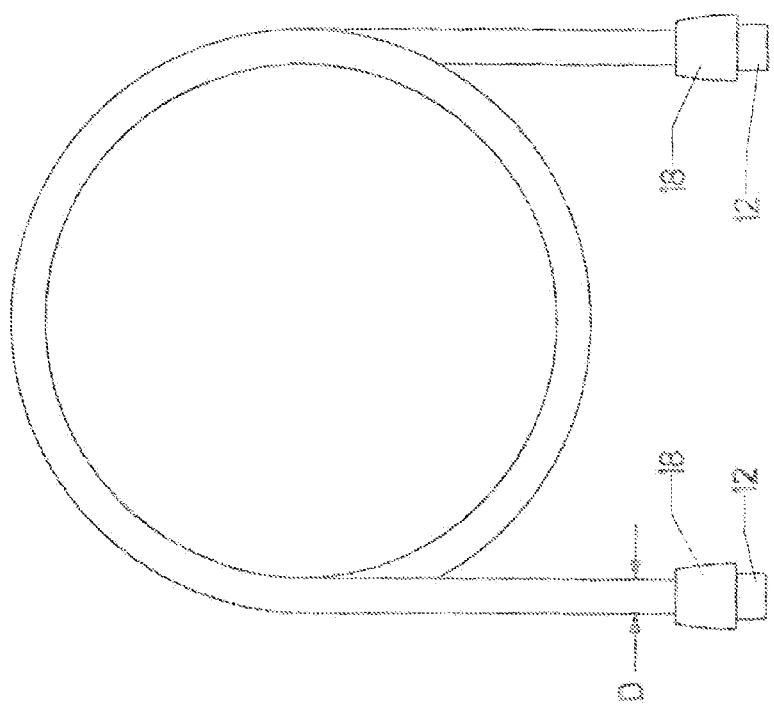
FIG. 2 is a plan view, showing a prior art HDMI cable.
Figure 3:
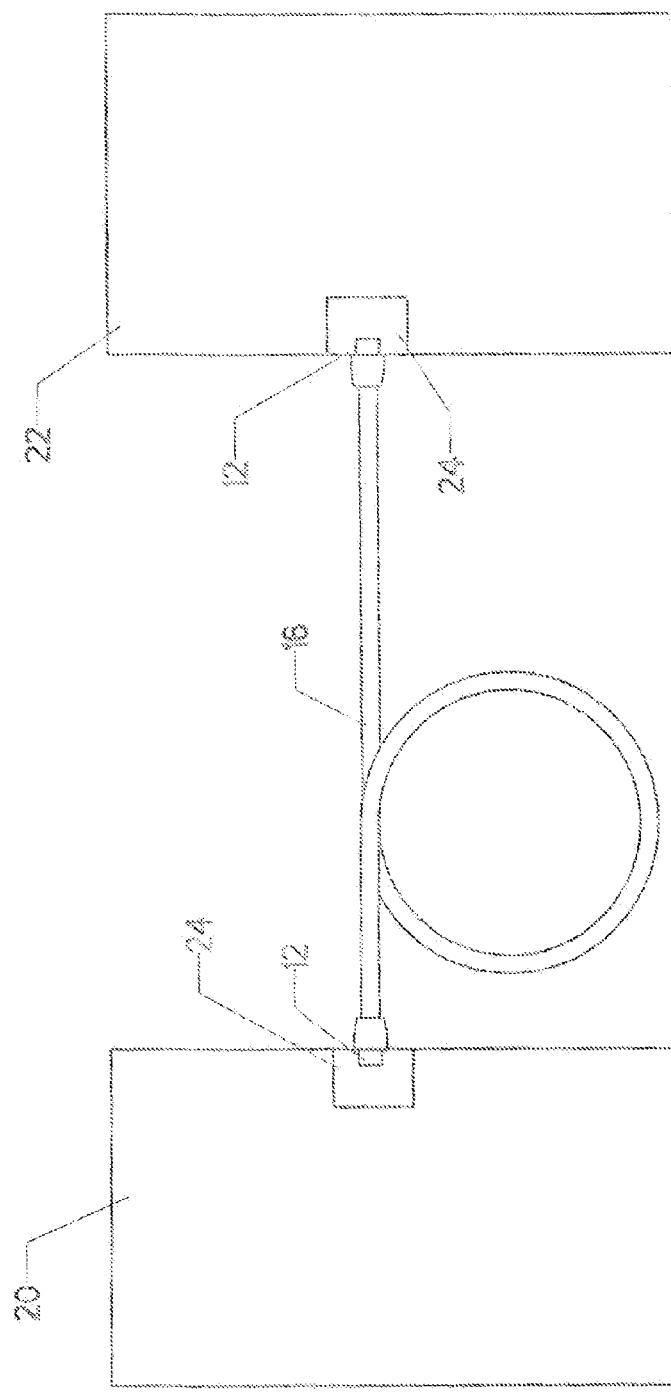
FIG. 3 is a plan view, showing a prior art HDMI cable connecting a source to a sink.
Figure 4:
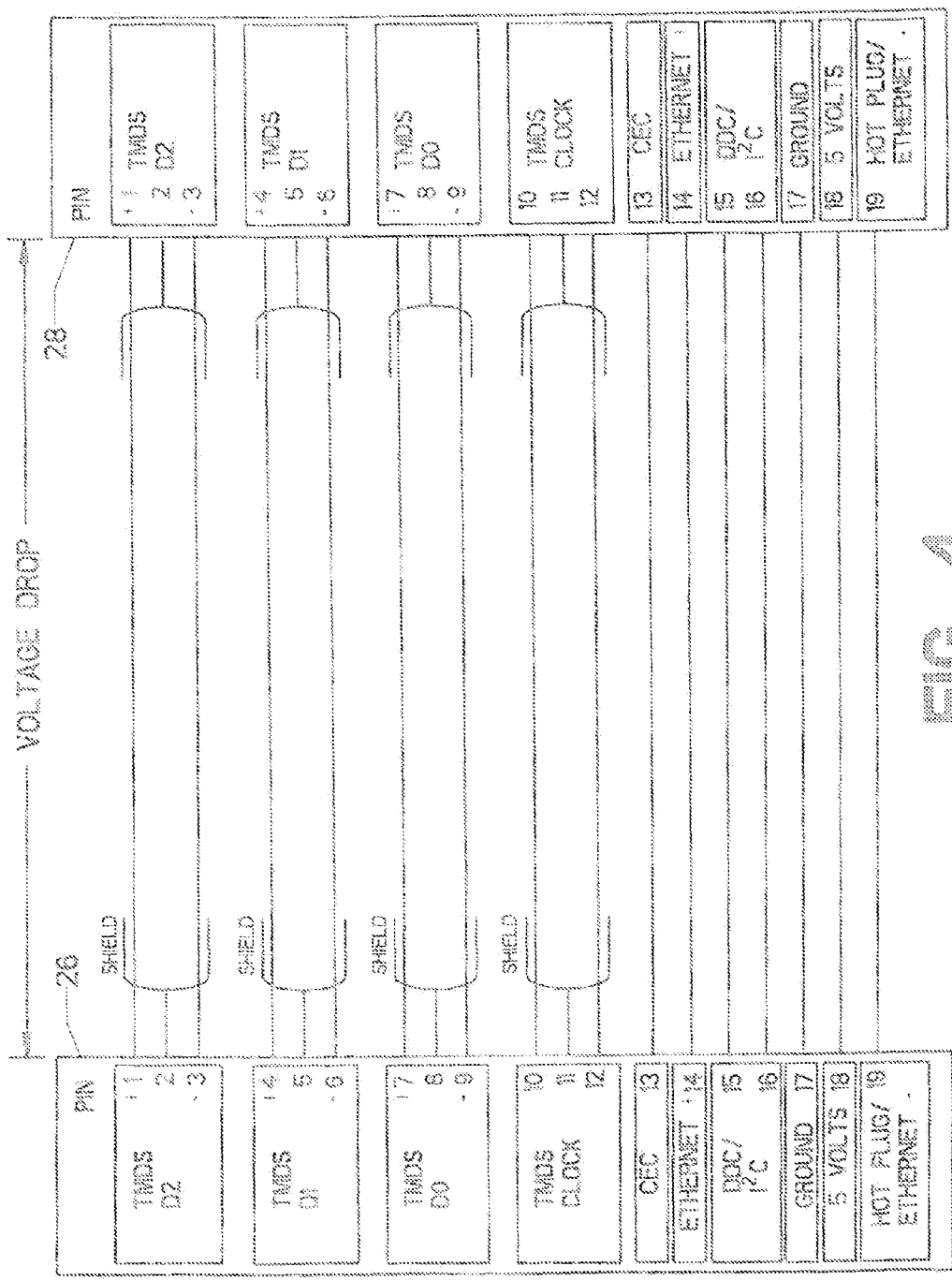
FIG. 4 is a schematic view, showing a prior art HDMI cable.
Figure 5:
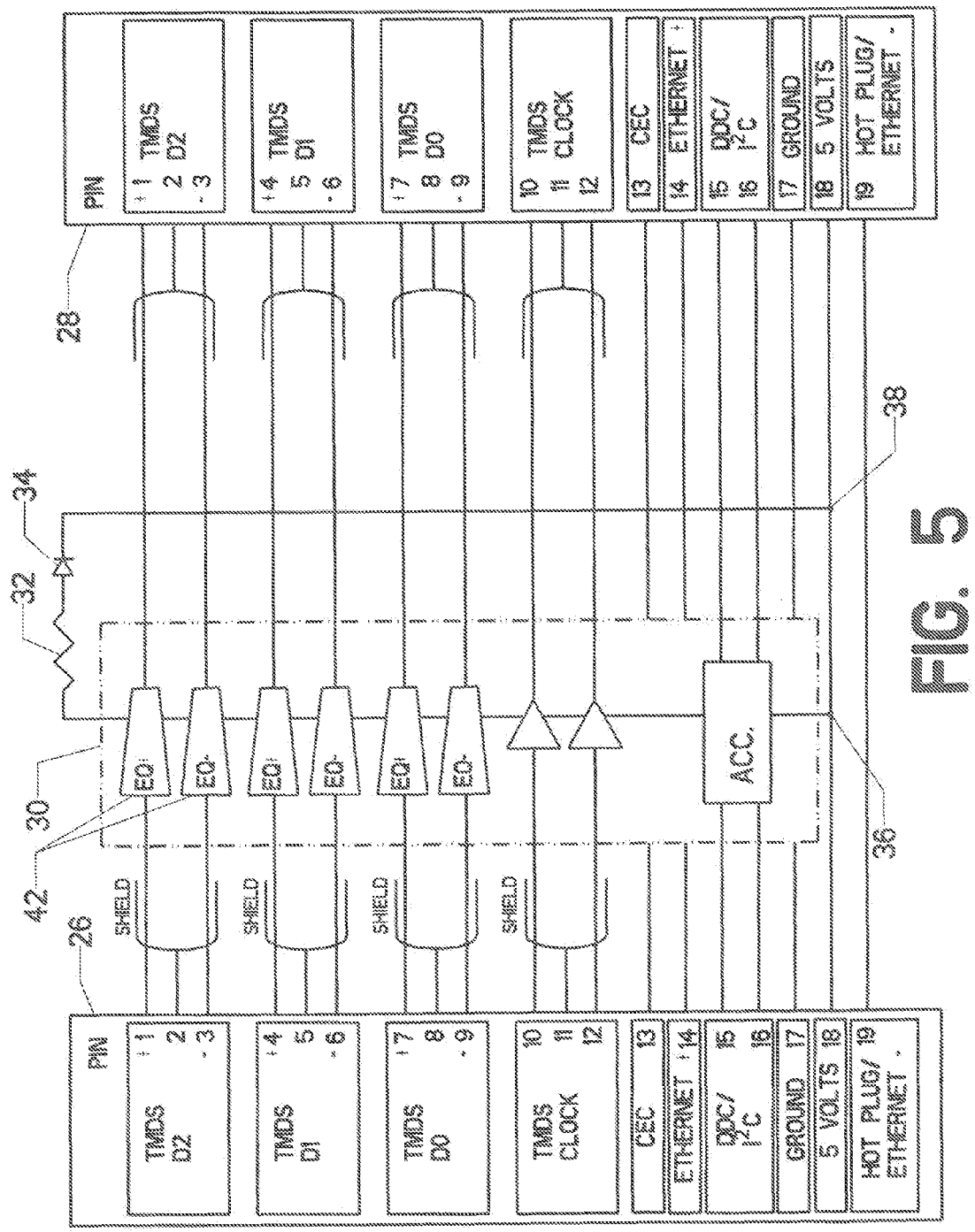
FIG. 5 is a schematic view, showing an active HDMI cable made according to the present invention.

The present invention solves the problems inherent in the prior art HDMI cables by installing an active component in the cable itself. FIG. 5 shows an HDMI cable constructed according to the present invention. The cable includes source connector 26, sink connector 28, and a plurality of conductors connecting the pins on both connectors. However, unlike the prior art, active cable compensator 30 is inserted between the two connectors.

Active cable compensator 30 includes multiple components that can act independently. However, in the preferred embodiment, all the components shown within the phantom line on FIG. 5 are combined into a single circuit board and even more preferably into a single integrated circuit.

Each of the lines within each TMDS signaling pair is provides with its own equalizer 42. In order to cover the three video data channels, six equalizers 42 are provided. Each equalizer is governed by software parameters that preferably control (1) gain, (2) frequency distribution, and (3) time skew. These parameters may be set individually for each equalizer. The frequency distribution may be set in order to boost the desired signal frequencies while attenuating unwanted frequencies that are typically produced by electromagnetic interference phenomena. The time skew feature allows adjustment between the two lines of a particular signaling pair so that the pairs arrive simultaneously at the sink connector.

A simple gain adjustment parameter is provided for each of the lines within, the TMDS clock, pair. Frequency adjustment is not typically needed for these lines, as they operate at a constant frequency. However, one certainly could substitute an equalizer for the simple amplifying devices shown.

Accelerator 40 is provided to address rise time issues occurring on the I²C bus. This bus line may encounter rise time issues that cause data transmission errors (both ways) and/or reduce the available data transmission speed. Accelerator 40 reduces the rise time delays and produces a more "square" edge. In the transitions for the defined logic low-voltage state to the defined high-voltage state.

Part of the power required by active cable compensator 30 is provided by the 5 volts available on Pin 18 of the HDMI connector. Tap 36 provides this power to the active cable compensator. The power flows through current limiting resistor 32, through diode 34, and back through return 38. However, under the HDMI standard, only 55 mA of current is available on this line. More power is needed, and this is obtained by "scavenging" some of the surplus power available on the TMDS lines (explained in more detail subsequently).

Many of the existing HDMI functions do not typically need to be altered by active cable compensator 30. In the embodiment shown in FIG. 5, CEC (Pin 13) and the Ethernet pair (Pins 14 and 19) are unaffected by active cable compensator 30. However, in other embodiments, the active cable compensator may operate on these lines as well.

Figure 6:
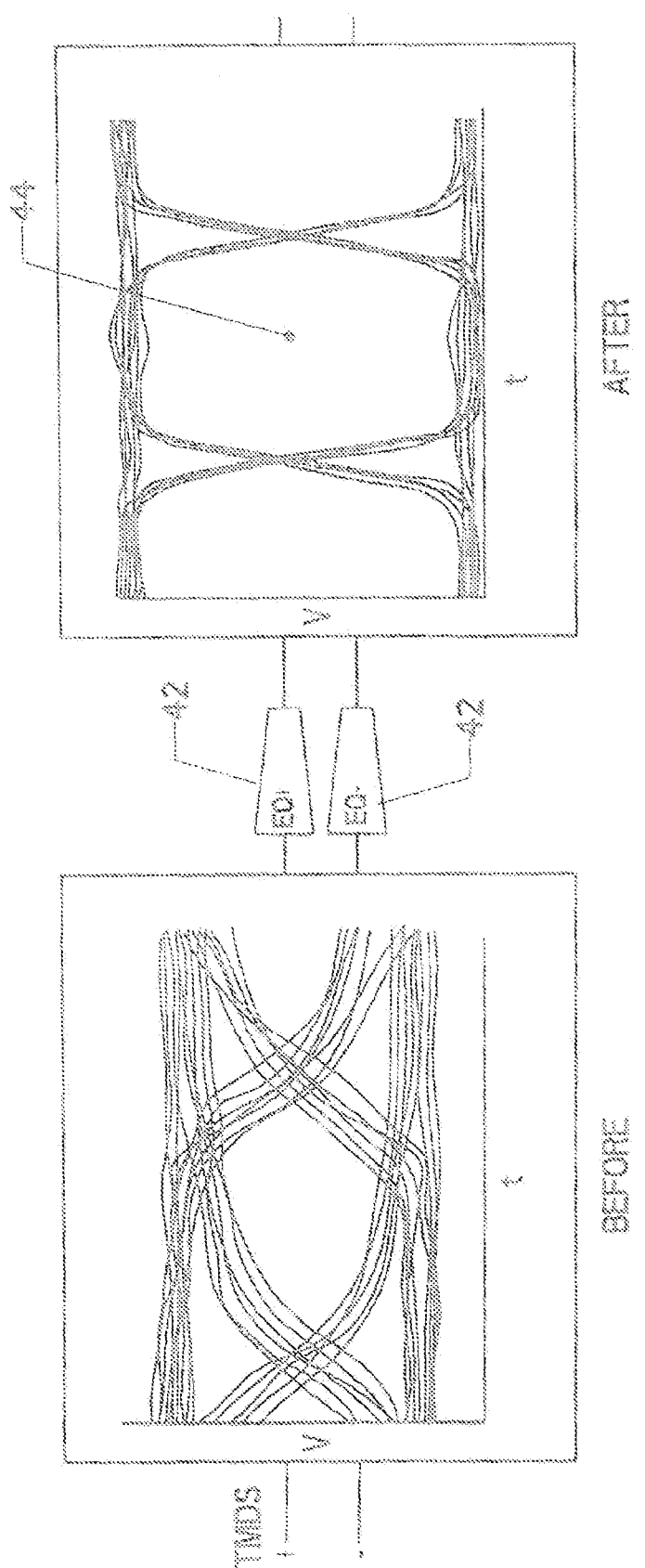
FIG. 6 is a graphical view, showing the effect of the parametric equalizers in the creation of an open eye plot.
Figure 7:
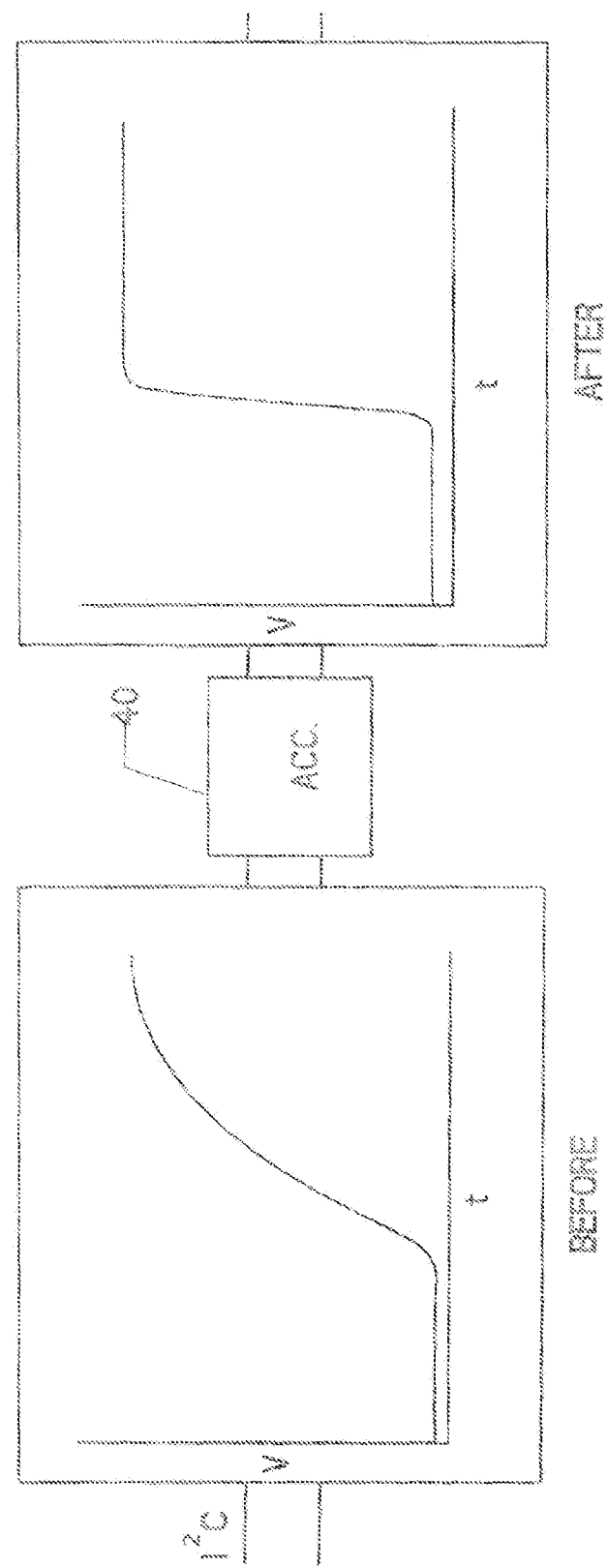
FIG. 7 is a graphical view, showing the effect of the accelerator in reducing rise time delay.

FIGS. 6 and 7 graphically illustrate the operational effects of the present invention. FIG. 6 shows the operation of two equalizers 42 applied to one of the TMDS pairs. Each equalizer operates on one of the paired conductors in a TMDS data channel. Two graphical views are presented, reflecting waveforms existing on the paired lines before entering the equalizer and after exiting the equalizer. The graphical views represent the familiar "eye pattern" that may be created on an oscilloscope display. While such patterns are well known to those skilled in the art, some explanation may benefit the reader's understanding.

An eye pattern is created on an oscilloscope display by repetitively sampling a digital data signal. The digital data signal is applied to the oscilloscope's vertical input while the nominal data rate is used to trigger the horizontal sweep. While such a display can be produced on the screen of a stand-alone oscilloscope, it is now more commonly produced using a computer with data sampling hardware and software.

However it is created, an eye pattern quickly and intuitively demonstrates many performance characteristics of the signal being sampled. For instance, studying an eye pattern allows an engineer to quickly determine if the signals are poorly timed, are poorly synchronized with the clock signal, are too noisy, change too slowly, or include amplitude discrepancies. An "open, eye" pattern generally corresponds to minimal signal distortion. The term "open eye" refers to the fact that a large area having no signal traces exists in the middle of the plot. Distortion of the signal waveform appears as a partial closure of this "open eye."

The two equalizers 42 shown in the view are amplifying equalizers. Software parameters are individually set for these equalizers. The parameters control gain and the frequency band to which the gain is applied. The parameters are adjusted to minimize eye closure. A good threshold to use in setting these parameters is to keep the eye closure above a 20% minimum eye limit.

FIG. 7 graphically depicts the operation of accelerator 40. The graphical view on the left is a rise-time plot made in the absence of the accelerator. The reader will note that the transition from the logic "0" state to the logic "1" state is delaye+d by capacitive effects in the line and is by no means a sharp shoulder. The accelerator operates to sharpen the transitions to the defined high voltage. The graphical plot on the right side of the view shows voltage rise versus time resulting from the operation, of accelerator 40.

The connection of multiple devices to an I²C bus can create high bus capacitance (well beyond the 400 pF limit set by the specification). As explained previously, this capacitive loading causes slow rise times across all the components connected to the bus. Even where only two components are using the bus, poor performance in one of these can cause slow rise times and ultimately affect data speed and reliability. The accelerator preferably uses a boosted pull-up current during the rising bus transitions (in order to accelerate the "0" to "1" transition) while disabling the current sources during the falling bus transitions (in order to accelerate the "1" to "0" transition). The result is the sharper rise plot shown in the right side of the view. This improves the performance of the cable itself and can even "fix" rise time problems caused by external components that are connected to the cable.

As stated previously, the active devices within active cable compensator 30 can be adjusted using programmable parameters. The use of these programmable parameters is one of the principle advantages of the present invention, as it allows each individual cable to be "tuned" for best performance. In order to understand the need for this process, it is important for the reader to understand some of the manufacturing processes used to create the cable.

One might naturally think that a fixed set of parameters could be used for each model of cable produced. The term "model" refers to one particular specification. For example, a cable specification might call for a 1 meter overall length, with the TMDS conductors being 40 American Wire Gage (a diameter of 0.00314 inches, or 0.0799 mm). One might think that a fixed value for gain and frequency distribution could be set for the equalizers used in this cable model. While this could be done, it would sacrifice a big advantage the present invention makes possible.

Not all conductors meeting the 40 AWG standard are alike. For example, a 40 AWG conductor is considered to be in specification if it fails within 0.0002 inches of the nominal value. Thus, the two conductors comprising a signal pair in a TMDS data channel might have diameters of 0.00294 inches and 0.00334 inches. The resistance of a conductor is linearly proportional to its cross-sectional area (within certain limits). The larger of the two conductors has a cross-sectional area that is 14% greater than the smaller. The electrical characteristics of the two conductors will be similarly different. While this represents an extreme case, even much smaller variations can affect cable performance. In addition, the result of the variations thus described increase linearly with cable length. A tolerance for the cross-section of the conductors used does not translate to a static value for the tolerance of the conductor itself. The tolerance of the resistance of the conductor itself—for example—increases proportionally with increasing cable length. Thus, a tolerance range that is acceptable for a 1 meter cable may be unacceptable for a 2 meter cable. And, the tolerance with respect to the conductor diameter is only one among several significant quantities. The purity of the conductor material, the consistency of the drawn cross-section, and the metal grain characteristics all affect the electrical properties.

The reader will thereby perceive that a "standard" set of parameters for each cable model may produce a good result for one particular example of that cable model and a bad result for another. The prior art approach to this recognized problem has been to use large conductor wires, in order to create a large margin for voltage loss, low resistance, etc. This approach increases cost and decreases the flexibility of the cable. The present invention avoids these problems by "custom timing" each individual cable.

Figure 8:
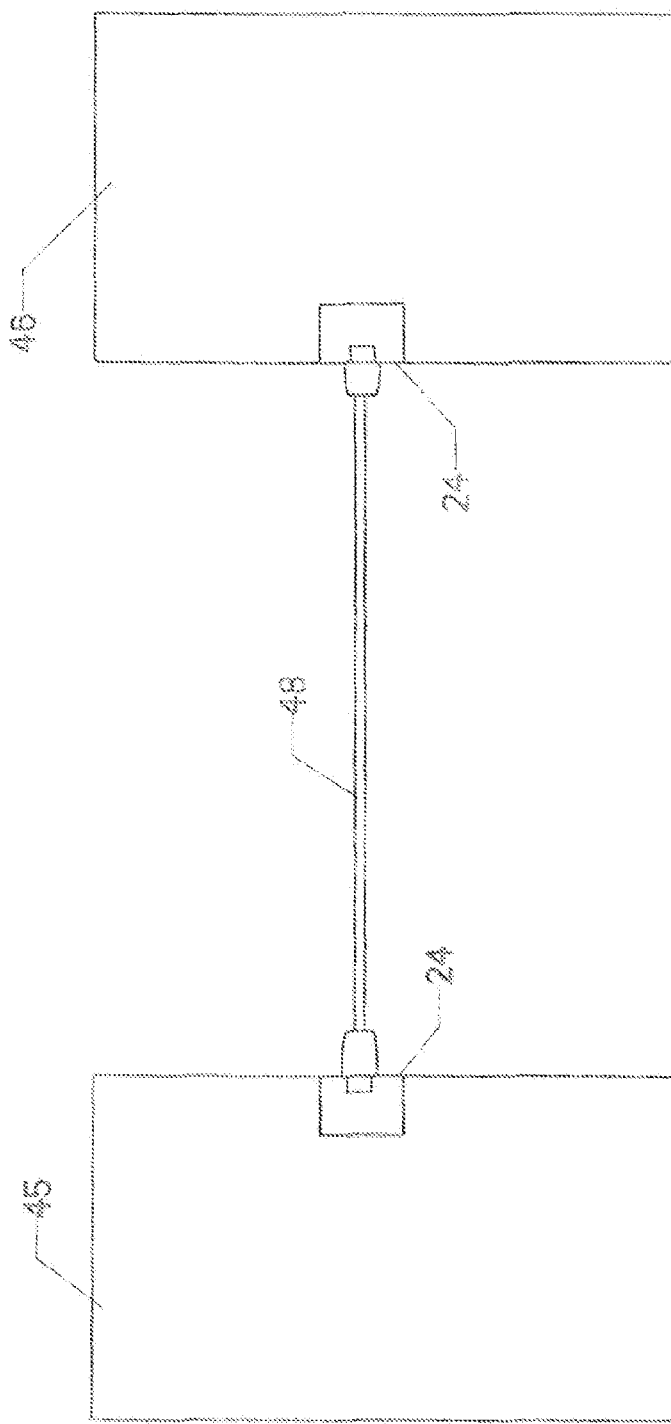
FIG. 8 is a plan view, showing the programming of an active HDMI cable made according to the present invention.
Figure 9:
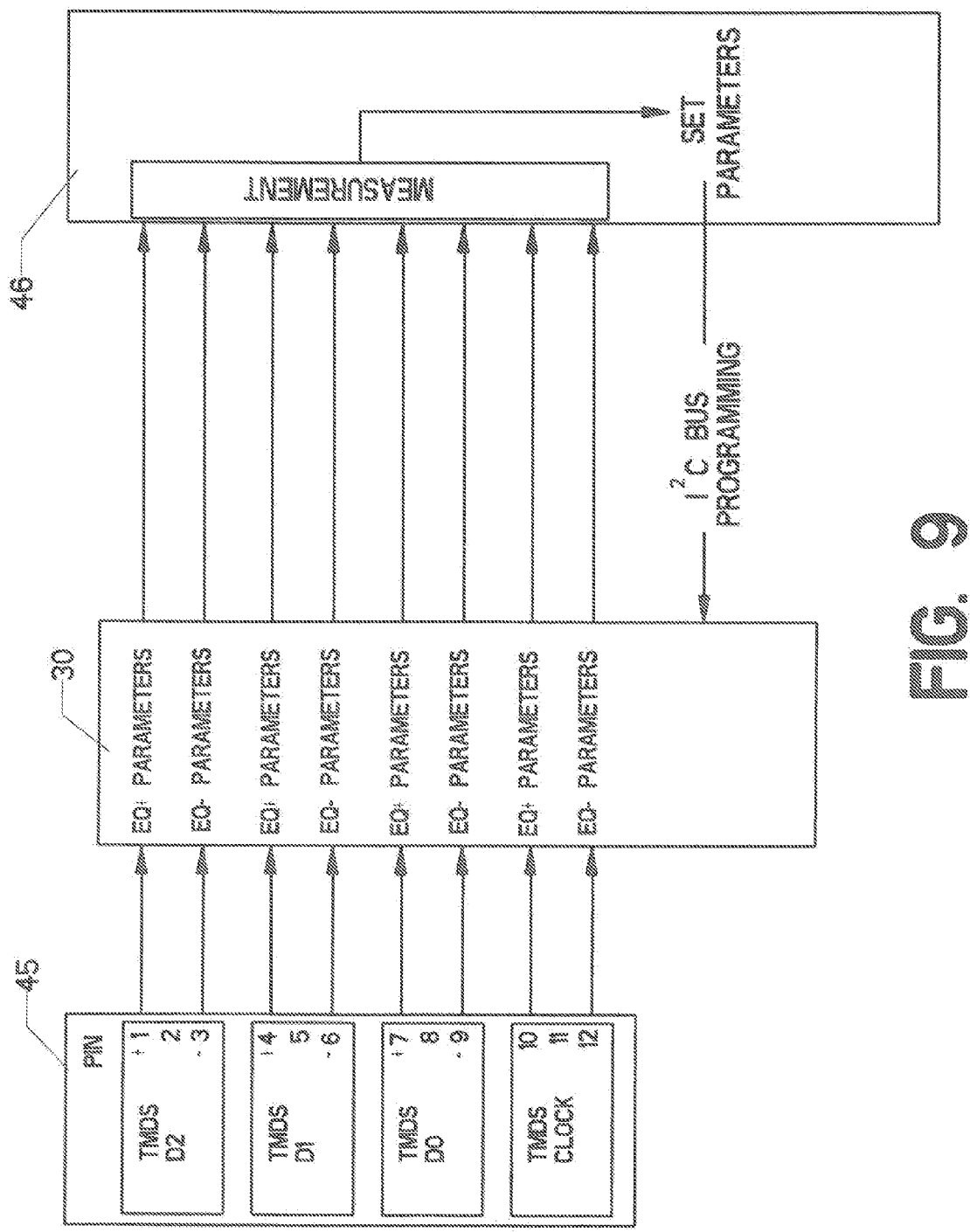
FIG. 9 is a schematic view, showing the setting of the parameters by the programming unit.

FIGS. 8 and 9 graphically illustrate the tuning (programming) process carried out by the present invention. FIG. 8 shows a particular active HDMI cable 48 connected between an HDMI receptacle 24 on calibration source 45 and a second HDMI receptacle on programming unit 46. Returning briefly to FIG. 5, the reader will recall that the components comprising active cable compensator 30 are actually contained within the active HDMI cable itself. These preferably assume the form of an integrated circuit and small circuit board that may be housed within one of the HDMI connectors.

Looking back at FIG. 8, calibration source 45 transmits calibration signals along at least the conductors that are used by the active cable compensator. Calibration signals are preferably sent along at least the TMDS data channels and the TMDS clock channel. Programming unit 46 receives these signals as transmitted through active HDMI cable 48.

FIG. 9 graphically illustrates the programming process. Programming unit 46 contains a measurement unit that measures the calibration signals as they are received through, the active HDMI cable. The programming unit also contains a memory containing a predefined set of performance criteria for each of the signals measured on each of the conductors. The reader will recall that the settings for each of the active components in the HDMI cable (such as the equalizers and the amplifiers) may be set by transmitting programmable parameters to the active cable compensator. The programming unit includes a parameter-setting command generator that generates an appropriate command for setting each of the parameters used by the active components. The programming unit then sends the parameter-setting commands to active cable compensator 30 via the I²C data bus. These commands are interpreted by the active cable compensator as commands to adjust the parameters. Each parameter may be adjusted individually.

The process thus described may be an iterative process in some cases. An adjustment command will be sent and the parameters will be altered accordingly. A new series of measurements are taken and an additional adjustment or adjustments may then be determined and transmitted. Those skilled in the art will realize that the creation of a suitable "open eye" pattern for the TMDS data channels may in fact require several iterations and some empirical experimentation. This entire process may be automated using software to control programming unit 46.

As an example, one parameter may adjust the gain for the amplifiers in the transmission lines for the TMDS clock signal. When the clock signal is first received in the programming unit, its logic "high" voltage may be measured as falling below the desired threshold criterion, in that case the programming unit sends commands over the I²C data bus that reset the controlling parameters to raise the gain. The received values are then measured again and the process repeats until the results are satisfactory. The accelerator is not actually shown in FIG. 9 but a similar measurement and adjustment process is preferably used to set the governing parameters for that active device as well.

Each cable programmed using this technique will get its own set of "custom" parameters and it is unlikely that any two cables will receive exactly the same set of parameters. The "calibration signals" sent by calibration source 44 can include any type of signal that is suitable for use in evaluating the characteristics of the cable—including signals that are not specifically designed for use in calibration.

In the embodiment described the I²C bus is used for the transmission of the programming signals. Those skilled in the art will know that it is possible to utilize one or more of the other available conduits for the transmission of such signals. One could even devise a scheme where the TMDS data lines themselves are used to transmit programming signals.

The use of the active compensation within the cable itself creates several significant advantages. These include: (1) a smaller conductor size for a given length of cable; (2) a smaller overall conductor bundle diameter; (3) greater mechanical flexibility of the cable; and (4) a fixed tolerance for the transmission characteristics regardless of the cable's length.

It is certainly preferable to encompass the components of active cable compensator 30 within (or mostly within) a single integrated circuit "chip." Such a chip may be made small enough to fit within the volume available in an HDMI connector. FIG. 10 shows such an embodiment. Source connector 26 is slight elongated so that it can house a small printed circuit board encompassing the active cable compensator. Vent 52 is provided to allow the circulation of ambient air in order to cool the chip.

Sink connector 28 may not contain any active electronics and may therefore assume a more compact form. Both the sink and source connectors include an HDMI connector 12 conforming to the description given previously.

Using the present invention it is possible to provide an HDMI cable that, is long, thin, and flexible. In some instances, the terminations of several such cables will be located in close proximity to each other. An example is the use of a rack-mounted video system that may have four or more HDMI receptacles in a stack. When several such cables are routed along a common path it can become difficult to determine which connector belongs to which cable. The embodiment of FIG. 10 includes a feature intended to assist with this problem.

Each connector in FIG. 10 includes a nub receiver 50. Color nub 54 is configured to snap into this nub receiver, where it will remain in place unless deliberately removed by a user. Multiple color nubs 54 are provided in a variety of colors. For example, color nubs that are green, red, yellow, blue, magenta, and white can be provided.

These nubs assist with cable management. For example, a user can place red color nubs on the two ends of a first cable and blue color nubs on the two ends of the second cable. The user may then easily determine which connector belongs to a particular cable.

Having received an explanation of the general characteristics of the present invention, the reader will benefit from an explanation of some detailed features and some specific examples. Returning to FIG. 5, the reader will recall that active cable compensator 30 contains multiple active components that require power to operate. As stated previously, some of the required power is taken from Pin 18. However, because this line is limited to 55 mA of current under the HDMI standard, more power must be obtained elsewhere. The invention solves the need for additional power by taking surplus power from each of the TMDS video channels.

Each of the 16 differential TMDS lines are pulled up to a 3.3 V rail supply voltage (on both the source and sink side). Active cable compensator 30 includes a power management system that manages the voltage distributions available on the differential TMDS lines and routes excess power available on these lines to the appropriate electronics within the active cable compensator. The available power can be managed so that less than all the 0.055 A available on the 5V line is used. This approach allows the active HDMI cable to run entirely on power available within the HDMI standard itself and eliminates the need for an external power supply. While one could certainly practice the present, invention using an external power supply, it is preferable to provide a unit that is self-contained.

Active HDMI cables made according to the present invention have been made in lengths of 1 meter, 2 meters, 3 meters, 4 meter, 5 meters, and more. The following performance criteria represent the preferred embodiments:

(1) High frequency digital video transmitted at 3.4 Gb/s supporting a minimum of 20% Eye Amplitude (referring to the "eye diagram" discussed previously);

(2) Voltage drops over the 5 VDC supply line (Pin 18) limited to 300 mV;

(3) I²C capacitive loading rise times limited to 800 ns;

(4) Intra-pair skew within the TMDS lines limited to 115 ps;

(5) Hot plug voltage drop limited to 2 V;

(6) Ethernet bandwidth limited to no more than 200 MHz at −6 dB;

(7) Overall diameter of conductor bundle not to exceed 3.5 mm;

(8) Wire gage used for conductors—customized for length of cable desired; and (9) Dimensional shielding—customized for high frequency emissions.

Some of these criteria are affected by adjusting the parameters in the active cable compensator and others are fixed solely via the initial process of selecting the conductor size, shielding, and other cable characteristics.

It is also preferable to independently select an appropriate wire gage for each of the functions carried by the active HDMI cable. An example of this selection process is;

(1) The 5 VDC line (Pin 18) is selected for current consumption and form factor;

(2) The Ethernet/Hot Plug lines are selected for 200 MHz bandwidth with no more than −6 dB of loss and less than 2 VDC drop for the hot plug function;

(3) The I²C picture and encryption line gage is calculated in conjunction to the accelerator used in order to create the desired rise time response;

(4) The TMDS data line gage is selected to pass a minimum of 20% eye closure while maintaining signal integrity (including consideration of the equalizers used);

(5) The TMDS clock line gage is selected to pass the 20% eye closure requirement.

The invention can of course be practiced using gage diameters larger than those set in the exemplary embodiments. However, the use of larger diameters increases cost and increases the cable's overall diameter. The optimization of the diameters is therefore preferred.

The reader should note that adjusting the parameters to meet the predefined signal criteria is not simply a matter of ramping up the gain on the various amplifiers. The parameters must be adjusted to create a balanced system. For example, the available gain is limited by the total amount of power available in those embodiments lacking an external power source and this must be considered. As another example, simply ramping up the gain will not create the desired "open eye" signal for the TMDS data lines. Gain must often be adjusted along with frequency distribution and skew in order to meet the desired 20% eye amplitude.

Although the preceding descriptions contain significant detail, they should not be construed as limiting the scope of the invention but rather as providing illustrations of the preferred embodiments of the invention. Those skilled in the art will know that many other variations are possible without departing from the scope of the invention. Accordingly, the scope of the invention should properly be determined with respect to the following claims rather than the examples given.

Having described our invention, we claim:

1. A method for improving signal quality in an active HDMI cable, comprising:
   a. providing an active HDMI cable, including,
      i. a positive TMDS D0 conductor,
      ii. a negative TMDS D0 conductor,
      iii. a positive TMDS D1 conductor,
      iv. a negative TMDS D1 conductor,
      v. positive TMDS D2 conductor,
      vi. a negative TMDS D2 conductor,
      vii. a positive TMDS clock conductor,
      viii. a negative TMDS clock conductor,
      ix. a digital data bus that is separate from said TMDS conductors;
   b. providing an active cable compensator in said active HDMI cable, said active cable compensator including,
      i. first signal-boosting active equalizer on said positive TMDS D0 conductor, said first active equalizer including variable gain and variable frequency distribution, with said gain and said frequency distribution being set by programmable parameters;
      ii. a second signal-boosting active equalizer on said negative TMDS D0 conductor, said second active equalizer including variable gain and variable frequency distribution, with said gain and said frequency distribution being set by programmable parameters, with said parameters for said second active equalizer being independent of said parameters for said first equalizer;
      iii. a third signal-boosting active equalizer on said positive TMDS D1 conductor, said third active equalizer including variable gain and variable frequency distribution, with said gain and said frequency distribution being set b programmable parameters;
      iv. A fourth signal-boosting active equalizer on said negative TMDS D1 conductor, said fourth active equalizer including variable gain and variable frequency distribution, with said gain and said frequency distribution being set by programmable, parameters, with said parameters for said fourth active equalizer being independent of said parameters for said third equalizer;
      v. a fifth signal-boosting active equalizer on said positive TMDS D2 conductor, said fifth active equalizer including variable gain and variable frequency distribution, with said gain and said frequency distribution being set by programmable parameters;
      a sixth signal-boosting active equalizer on said negative TMDS D2 conductor, said sixth active equalizer including variable gain and variable frequency distribution, with said gain and said frequency distribution being set by programmable parameters with said parameters for said sixth active equalizer being independent of said parameters for said fifth equalizer;
      vii. a first amplifier on said positive TMDS clock conductor, said first amplifier including variable gain, with said gain being set by at least one programmable parameter,
      viii. a second amplifier on said negative TMDS conductor, said second amplifier including variable gain, with said gain being set by at least one programmable parameter, with said gain parameter for said second amplifier being independent of said gain parameter for said first amplifier,
      ix. wherein said active cable compensator is able to receive parameter-setting commands on said digital data bus, with said parameter-setting commands setting said programmable parameters on said equalizers and said amplifiers;
   c. providing a signal source;
   d. providing a programming unit, said programming unit including,
      i. a measurement unit able to measure a signal on each line of each of said TMDS conductors,
      ii. a predefined set of performance criteria for a signal received on each of said TMDS conductors, including a logic-high voltage threshold;
      iii. a parameter-setting command generator for generating said parameter-setting commands to be sent to said active cable compensator;
   e. connecting said active HDMI cable between said signal source and said programming unit;
   f. determining a total amount of power available for said equalizers and said amplifiers by,
      i. determining an amount of power available on a 5 volt DC supply line in said active HDMI cable, and
      ii. determining an additional amount of power available as excess power on said TMDS conductors;
   g. sending said parameter-setting commands from said programming unit to said active cable compensator over said separate digital data bus, wherein said parameter-setting commands set said programmable parameters on said equalizers and said amplifiers in order to adjust stud signals on said TMDS conductors so that,
      i. said logic-high voltage on each of said TMDS conductors is raised above said defined logic-high voltage threshold, and
      ii. a total power consumed by said equalizers and amplifiers does not exceed said determined amount of power available.

2. A method for improving signal quality in an active HDMI cable as recited in claim 1 further comprising:
   a. providing some of the power needed for said equalizers and said amplifiers by tapping a 5 volt DC supply line in said active HDMI cable; and
   b. providing the remainder of the power needed by said equalizers and said amplifiers by using excess power available on said TMDS conductors.

3. A method for improving signal quality in an active HDMI cable as recited in claim 1, further comprising providing an accelerator on said separate digital data bus.

4. A method for improving signal quality in an active HDMI cable as recited claim 1, further comprising providing at least a portion of the power needed for said equalizers and said amplifiers by tapping a 5 volt DC supply line in said active HDMI cable.

5. A method for improving signal quality in an active HDMI cable as recited in claim 4, further comprising providing at least is portion of the power needed for said equalizers and said amplifiers by using excess power available on said TMDS conductors.

6. A method for improving signal quality in an active HDMI cable as recited in claim 1, wherein said predefined set of performance criteria includes supporting a minimum of 20% eye amplitude on said TMDS conductors.

7. A method for improving signal quality in an active HDMI cable as recited in claim 1, wherein said predefined set of performance criteria includes limiting intra-pair skew within said TMDS lines to 115 picoseconds.

8. A method for improving signal quality in an active HDMI cable as recited in claim 1, wherein said predefined set of performance criteria includes limiting capacitive loading rise times on said separate digital data bus to 800 nanoseconds.

9. A method for improving signal quality in an active HDMI cable as recited in claim 4, wherein said predefined set of performance criteria includes limiting a voltage drop on said 5 volt DC supply line to 300 mV.

10. A method for improving signal quality in an active HDMI cable as recited in claim 1, wherein said predefined set of performance criteria includes:
 a. supporting a minimum of 20% eye amplitude on said TMDS conductors;
 b. limiting intra-pair skew within said TMDS lines to 115 picoseconds;
 c. limiting capacitive loading rise times on said separate digital data bus to 800 nanoseconds; and
 d. limiting a voltage drop on said 5 volt DC supply line to 300 mV.

11. A method for improving signal quality in an active HDMI cable, comprising:
 a. providing an active HDMI cable, including,
  i. TMDS conductor pairs for a first channel, a second channel, a third channel, and a clock channel,
  ii. a digital data bus that is separate from said TMDS conductor pairs;
 b. proving an active cable compensator in said active HDMI cable, said active cable compensator including,
  i. a signal-boosting active equalizer for each conductor in said TMDS conductor pairs for said first, second, and third channels, wherein each of said active equalizers includes variable gain and variable frequency distribution, with said gain and said frequency distribution being set independently for each equalizer by programmable parameters;
  ii. an amplifier for each conductor in said TMDS clock channel, wherein each of said amplifiers includes variable gain, with said gain for each of said amplifiers being set independently by at least one programmable parameter,
  iii. wherein said active cable compensator is able to receive parameter-setting commands on said digital data bus, with said parameter-setting commands setting said programmable parameters on said equalizers and said amplifiers;
 c. providing a signal source;
 d. providing a programming unit, said programming unit including,
  i. a measurement unit able to measure a signal on each line of each of said TMDS conductors in each said TMDS conductor pairs,
  ii. a predefined set of performance criteria for a signal received on each of said TMDS conductors, including a logic high-voltage threshold;
  iii. parameter-setting command generator for generating said parameter-setting commands to be sent to said active cable compensator;
 e. connecting said active HDMI cable between said signal source and said programming unit;
 f. determining a total amount of power available for said equalizers and said amplifiers by,
  i. determining an amount of power on a 5 volt DC supply line in said active HDMI cable, and
  ii. determining an additional amount of power available as excess power on said TMDS conductors;
 g. sending said parameter-setting commands from said programming unit to said active cable compensator over said separate digital data bus, wherein said parameter-setting commands set said programmable parameters on said equalizers and said amplifiers in order to adjust said signals on said TMDS conductors so that,
  i. said logic-high voltage on each of said TMDS conductors is raised above said defined logic-high voltage threshold, and
  ii. a total power consumed by said equalizers and amplifiers does not exceed said determined total amount of power available.

12. A method for improving signal quality in an active HDMI cable as recited in claim 11, further comprising,
 a. providing some of the power needed for said equalizers and said amplifiers by tapping a 5 volt DC supply line in said active HDMI cable; and
 b. providing the remainder of the power needed by said equalizers and said amplifiers by using excess power available on said TMDS conductors.

13. A method for improving signal quality in an active HDMI cable as recited in claim 11, further comprising providing an accelerator on said separate digital data bus.

14. A method for improving signal quality in an active HDMI cable as recited in claim 11, further comprising providing at least a portion of the power needed for said equalizers and said amplifiers by tapping a 5 volt DC supply line in said active HDMI cable.

15. A method for improving signal quality in an active HDMI cable as recited in claim 14, further comprising providing at least a portion of the power needed for said equalizers and said amplifiers by using excess power available on said TMDS conductors.

16. A method for improving signal quality in an active HDMI cable as recited in claim 11, wherein said predefined set of performance criteria includes supporting a minimum of 20% eye amplitude on said TMDS conductors.

17. A method for improving signal quality in an active HDMI cable as recited in claim 11, wherein said predefined set of performance criteria includes limiting intra-pair skew within said TMDS lines to 115 picoseconds.

18. A method for improving signal quality in an active HDMI cable as recited in claim 11, wherein said predefined set of performance criteria includes limiting capacitive loading rise times on said separate digital data bus to 800 nanoseconds.

19. A method for improving signal quality in an active HDMI cable as recited in claim 14, wherein said predefined set of performance criteria includes limiting a voltage drop on said 5 volt DC supply line to 300 mV.

20. A method for improving signal quality in an active HDMI cable as recited in claim 11, wherein said predefined set of performance criteria includes:
 a. supporting a minimum of 20% eye amplitude on said TMDS conductors;
 b. limiting intra-pair skew within said TMDS lines to 115 picoseconds;
 c. limiting capacitive loading rise times on said separate digital data bus to 800 nanoseconds; and
 d. limiting a voltage drop on said 5 volt DC supply line to 300 mV.

* * * * *